United States Patent [19]
Hedges

[11] 3,857,214
[45] Dec. 31, 1974

[54] METHOD OF MAKING TOMBSTONES AND PRODUCT THEREOF

[76] Inventor: Carl D. Hedges, 1806 East 3rd St., Pueblo, Colo. 81001

[22] Filed: Nov. 15, 1972

[21] Appl. No.: 306,576

[52] U.S. Cl. .................................. 52/103, 52/309
[51] Int. Cl. ........................ E04h 13/00, E01f 9/02
[58] Field of Search ............... 52/103, 104, 309, 38

[56] References Cited
UNITED STATES PATENTS

| | | | |
|---|---|---|---|
| 394,650 | 12/1888 | Holl | 52/104 |
| 582,470 | 5/1897 | Hammond | 52/104 |
| 728,993 | 5/1903 | Scott | 52/103 |
| 1,214,319 | 1/1917 | Kennedy et al. | 52/38 |
| 2,013,377 | 9/1935 | Debs | 52/104 |
| 3,145,502 | 8/1964 | Rubenstein | 52/309 |
| 3,440,788 | 4/1969 | Merget | 52/309 |

FOREIGN PATENTS OR APPLICATIONS

| | | | |
|---|---|---|---|
| 1,434,737 | 2/1969 | Germany | 52/103 |
| 1,559,251 | 10/1969 | Germany | 52/103 |

*Primary Examiner*—Frank L. Abbott
*Assistant Examiner*—James L. Ridgill, Jr.
*Attorney, Agent, or Firm*—Richard D. Law

[57] ABSTRACT

A smooth exterior surface hollow box of a glass fiber reinforced synthetic plastic filled with concrete and placed on a base forms a highly durable tombstone. An inscription is easily embossed into the molded glass fiber exterior.

3 Claims, 4 Drawing Figures

PATENTED DEC 31 1974　　3,857,214

METHOD OF MAKING TOMBSTONES AND PRODUCT THEREOF

Traditionally, tombstones, headstones, or the like are made of marble or granite or other natural rock. These may contain at least one polished surface, usually the surface into which the necessary inscription is engraved. Such stones are expensive, are difficult to handle, and are expensive to transport, but are not as durable as might be expected. Water freezing and thawing in cracks and crevices may cause a breaking of the stone. Such stones are prone to weathering. In moist and wet climates the stones deteriorate rapidly.

Additionally, the engraving of such marble and granite stones is quite difficult and requires heavy duty rock cutting equipment. The same is true of the shaping and polishing of material, which generally involves large equipment with a high capital outlay and high maintenance costs of such tooling. All the shaping, polishing and engraving requires a great amount of hand labor as well as the specialized equipment. Further, considerable man hours of time are necessary to complete the headstones, inscribe them and then to set them in place. The transportation of these heavy objects necessitates generally a small and local industry, and it is, thus, considerably more expensive than the use of production line methods.

According to the present invention, there is provided a composite headstone which has a highly durable glass fiber filled resin exterior and an inexpensive concrete interior for body and weight. These shells of glass fiber filled resin may be manufactured at a central location and inexpensively shipped transcontinental since the items are relatively light. The shell may be, also, engraved at the central location using mass production methods or may be engraved by fairly simple tools at a local engraving shop since engraving is easily done in the synthetic resin with relatively few tools. This lightweight shell is then transported to the place of use and filled in situ with concrete, and then some types require placing on a base and are permitted to cure. Thus, there is essentially no handling of heavy stone monuments and only a minimum of equipment is needed for the casting of the composite headstones in situ.

It is, therefore, among the objects and advantages of the present invention to provide an inexpensive, highly durable headstone.

Another object of the invention is to provide a composite headstone having a glass fiber filled durable plastic shell which is filled with inexpensive concrete in situ.

Another object of the invention is to provide an inexpensive method of forming a headstone which involves precasting an outer highly durable glass fiber filled synthetic resin which is filled with concrete in place, forming a highly durable headstone.

Another object of the invention is to provide a glass fiber and mineral filled synthetic resin shell for concrete headstone which may be simply made of any size or shape or color desired.

These and other objects and advantages of the invention may be readily ascertained by referring to the following description and appended illustrations in which.

Figure 1:
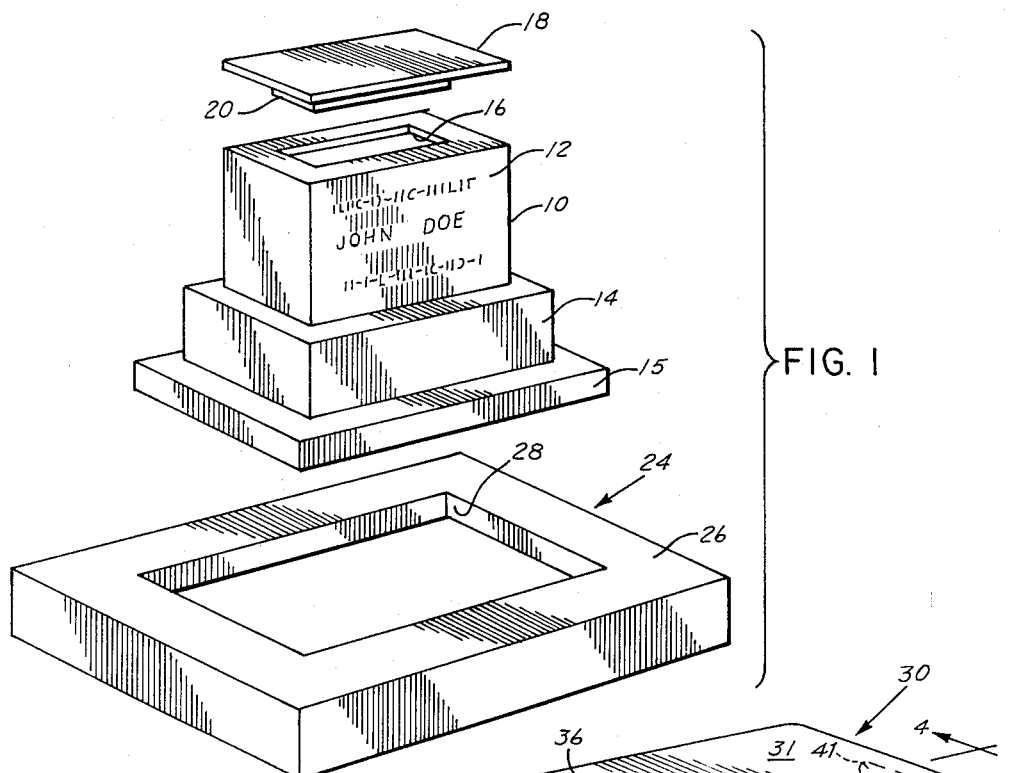
FIG. 1 is an exploded view of one form of headstone according to the invention.
Figures 2, 4:
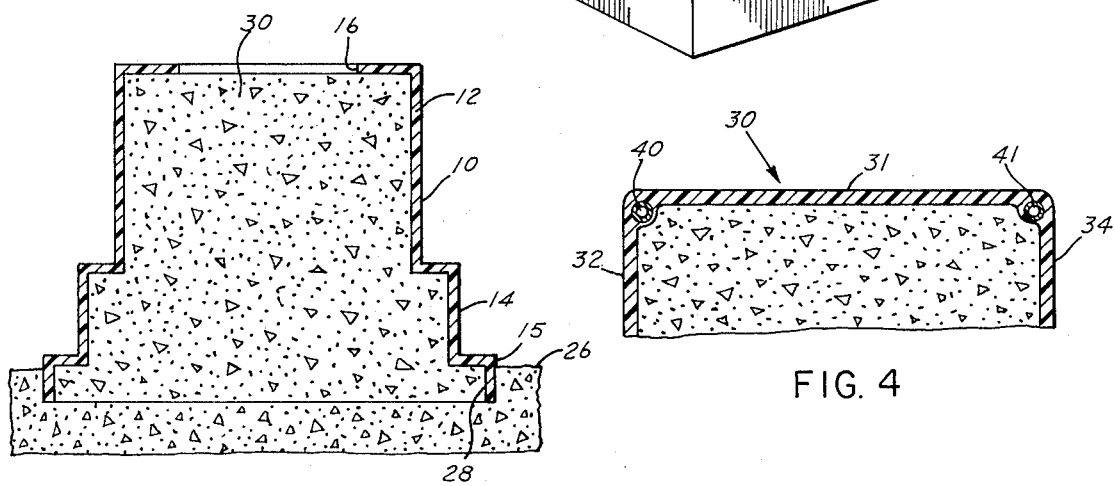
FIG. 2 is a side elevation cross sectional view of the upper monument portion of the device of FIG. 1.
FIG. 4 is a cross sectional view of the headstone of FIG. 3 taken along section lines 4—4.

In the device selected for illustration in FIGS. 1 and 2, a fiber glass shell 10, which forms an above-ground monument or headstone, includes an upper rectangular box section 12, an intermediate flat box section 14 and a lower section 15 which is quite thin relative to sections 12 and 14. Section 12 includes an opening 16, and a cover 18 which is arranged to cover the top of the section 12. A rectangular cover portion depends from the cover 18 and fits in the opening 16. The monument is arranged to fit in an opening in a base which is poured concrete at the grave site. In this case, a base 24 is a rectangular flat section 26 having a rectangular opening 28 therein which is arranged to just permit telescoping of the section 15 therein. In most instances, such a base section is cast in place on the grave site, to subsequently receive the monument when cured.

The shell is cast with one or more smooth, glossy, planar surfaces. Inscriptions may be engraved on any of the smooth surfaces. Such engraving may be accomplished by simple rotary engraving tools such as are used to engrave soft metals, or jeweler's engravers. The engraving should not extend all the way through the shell.

The glass fiber reinforced synthetic plastic is hard, rigid and completely water proof. It is durable, rigid and completely water proof. It is durable, with a life expectancy of many times granite or marble. Material similar to missile nose cones, etc. is very durable and satisfactory for the monument. The shape of the shell may be as desired, to simulate rock or stone, in the form of statues, conventional and unconventional shapes of gravestones, headstones, tombstones, mausoleums, etc. The exterior surface may be rough, smooth, planar, sinuous, bumpy, carved, etc., as may be desired. The negative form is prepared for any desired effect.

In using the device of the invention, the base 24 is first cast, nominally in a form set in the ground so that the top of the section 26 is at ground level with the depression 28 set slightly below ground level. Alternatively, a base may be precast away from the grave and then transported to the location where it is set in the ground.

The top 10 is glass fiber filled synthetic resin with the bottom section 15 arranged to seat in the opening 28 with the section 15 slightly extending thereabove or flush as desired. With the shell in place, it is then filled with concrete 30 and permitted to cure. After curing or during curing, the top 18 may be placed in position with adhesive or the like to completely seal the cover into the cement and onto the top of the shell 10.

The shell may be cast at a central factory and shipped to locales throughout the United States or the world as may be desired. The engraving of such glass fiber filled synthetic resin shells is quite simple since most jeweler's engraving tools are available for engraving the resins. This may be done at the central factory or at local engraving shops as may be desired. The shells whether engraved or not are light, and are inexpensively shipped to various locations where they are arranged to be filled in the place of use.

The glass fiber reinforced synthetic resin shell may be manufactured by any other known methods of manufacturing such shells. The plastics used in this are normally referred to as reinforced plastics and in general, for purposes of the present invention, include mainly glass fiber filling along with various types of mineral fillings to provide color, and simulated appearance. Some of the common methods of fabrication may be used including a method known as a contact, bag molding, matched dies, vacuum impregnating holding, etc. The contact molding is a contact layup molding procedure, where such articles are fabricated generally without the use of pressure and very little heat may be used in curing. The reinforcing material is generally laid up by hand on a mold and then liquid resin is applied by brush, spatula, spray gun or the like. In the bag molding method, a general procedure is similar to that of the layup method except that pressure is exerted on the wet layup by means of an inflatable flexible bag. With the bag method, air pressure in the bag exerts its pressure on the wet layup material and this may then be treated and vacuum drawn on the laid up material to provide a denser reinforced resin. In the matched metal die molding, a machine of mating molds of metal may be used to apply pressures on the reinforced resin to provide a short cure cycle and a high production rate. Various other similar types of molding procedures may be used to form the shell.

The glass fibers may be sometimes replaced by asbestos fibers or the like to produce satisfactory shells. The resins which may be used include melamine, silicone, unsaturated polyester, epoxy and various types of phenolic and similar resins, all of which are known. In the device shown in FIGS. 1 and 2, complex shapes are shown utilizing a top opening for filling the shell. After being placed on a base in situ with concrete so that no further movement of the unit is necessary.

Figure 3:
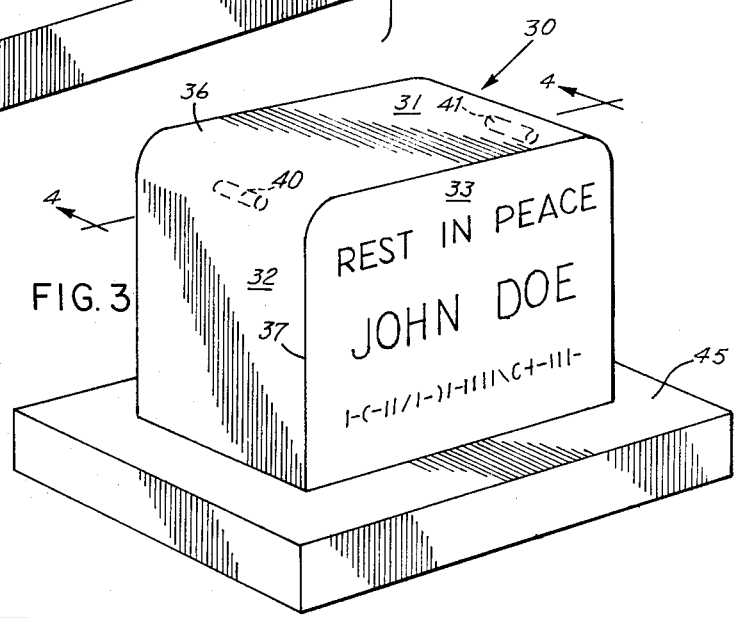
FIG. 3 is a perspective view of a simplified form of headstone according to the invention.

In FIGS. 3 and 4, a very simple rectangular boxlike shell is provided in which the shell has but a single opening which is turned down after the concrete is set sufficiently in the shell so that it doesn't spill out on turning it over. This provides a highly weather-proof, completely enclosed device. As illustrated in FIGS. 3 and 4, a rectangular box-like shell 30 includes a smooth upper surface 31, side surfaces 32, 33, 34, 35 (the last two not being shown), which are integral with each other along integral corner lines, for example, corner line 36 and 37, forming in effect a one piece integral shell. On opposed upper inside corners are a pair of tubes 40 and 41 imbedded in the wall of a reinforced plastic material to provide means for securing the shell over a concrete filling. These may be metal, plastic or similar tubes which are formed in the wall and which have open ends arranged to be filled or at least partially filled with concrete which sets and anchors the shell to the concrete.

The device is used by transporting the shell to the grave site, and a base 45 having previously been poured and set provides a base for the synthetic tombstone. The shell is turned upside down so that the open bottom is facing up. This may be placed on the base as the base is level and provides a hard surface. Concrete is then poured into the shell and muddled to release air and completely fill the shell. The concrete in the shell is then permitted to set for a short period. For example, in an hour or so, the shell is then turned upside down on the base, centered and permitted to set. In some instances it may be desirable to have reinforcing rods extending up through the base which will penetrate the soft concrete in the shell and provide means of completely anchoring the cured "stone" to the base.

The shell may be formed of glass fiber reinforced, synthetic resin, with or without mineral filler for color, and one or more surfaces may be engraved with the inscription desired for the plot. The shape of the shell is determined by the desires of the user. For example, government headstone markers are approximately 2½ feet long and 14 inches wide and about 6 inches thick, with the insciption in the top surface. For this purpose, a shell of the glass fibre reinforced synthetic resin may be made of the size and shape of the marker desired, and in forming a black and gray dust may be incorporated in the resin of at least the outer surface to provide the appearance of black marble. The insciprtion may be engraved in the top of the shell, and after being filled with concrete partially set and then turned over on the base. The completed, composite headstone of the synthetic material is essentially visually the same as such headstones made of marble or granite.

Various types of mineral fillers may be used and these generally are inorganic substances, for example, rock, marble and the like, ground quite finely and imbedded or mixed with the liquid plastic which makes the outside surface of the shell. Additionally, some of the remaining resin may, also, have included therein the filler to give depth of color to the fiber glass shell. As pointed out above, by using powdered rock of the type which it is to simulate, the finished synthetic resin will closely match the color and character of a similar headstone made of the rock or marble.

I claim:

1. A composite tombstone comprising:
   a. an exterior, unitarily formed one-piece hollow shell of fiber reinforced synthetic resin, said shell having at least one flat outer surface arranged for engraving an inscription thereon, said shell further including at least one open end with the open end being arranged to be inserted into a base at a point of use;
   b. a solid, interior body formed from a heavy, hardened material and arranged to fill the interior of said exterior shell, said body material being introduced into said shell in a semi-fluid state and allowed to harden, and
   c. said shell includes a plurality of hollow, cylindrical tubes each having a longitudinal axis, each of said tubes being fixedly embedded along a portion of its outer surface into the inside surface of said shell and having its ends open, the longitudinal axis of each of said tubes being arranged parallel to a plane defined by the open end of said shell, the open ends of said tubes being arranged to communicate with the hollow interior of said shell so that the hardenable body material will at least partially fill said tubes to securely join said body to said shell.

2. In combination with the composite tombstone as defined in claim 1, the combination includes:
   a base member formed from a heavy material and having a central opening therein, said opening being sized and receiving the open end of said tombstone which is inserted therein so as to hold said tombstone in an upright position.

3. A composite tombstone as defined in claim 1 wherein:
   the fiber reinforced synthetic resin for said shell includes a finely ground mineral filler to give an appearance of rock, marble and the like to said shell.

* * * * *